United States Patent [19]
Wada et al.

[11] Patent Number: 4,999,509
[45] Date of Patent: Mar. 12, 1991

[54] OPTICAL MEASURING DEVICE OF FILM THICKNESS

[75] Inventors: Yorio Wada, Suginami; Kazushi Hyakumura, Hachiouji, both of Japan

[73] Assignee: Olympus Optical Co., Ltd., Tokyo, Japan

[21] Appl. No.: 498,893

[22] Filed: Mar. 26, 1990

[30] Foreign Application Priority Data

Mar. 27, 1989 [JP] Japan .................................. 1-74411

[51] Int. Cl.⁵ ............................................ G01N 21/86
[52] U.S. Cl. ..................................... 250/560; 356/381
[58] Field of Search ................ 250/560; 356/381, 382; 350/3.72; 357/2; 118/620; 364/713; 427/53.1

[56] References Cited

U.S. PATENT DOCUMENTS

| | | | |
|---|---|---|---|
| 3,869,211 | 3/1975 | Watanable et al. | 250/560 |
| 4,666,305 | 5/1987 | Mochida et al. | 250/560 |
| 4,787,749 | 11/1988 | Ban et al. | 356/382 |

OTHER PUBLICATIONS

Handbook of Optical Constants of Solids, pp. 564-565-1985.

Primary Examiner—David C. Nelms
Assistant Examiner—Que Tan Le
Attorney, Agent, or Firm—Cushman, Darby & Cushman

[57] ABSTRACT

The optical measuring device of film thickness consists of a spectral reflectance measuring device and a film thickness deciding device. The film thickness deciding device comprises a reflectance operating device, an evaluation function operating device, a global optimization device, a local optimization device, and settlement judging devices added to the global optimization device and the local optimization device respectively. A data selecting device may be interposed between the spectral reflectance measuring device and the film thickness deciding device. The optical measuring device of film thickness is capable of measuring thickness of individual layers of a multi-layer film simultaneously, speedily and accurately.

2 Claims, 3 Drawing Sheets

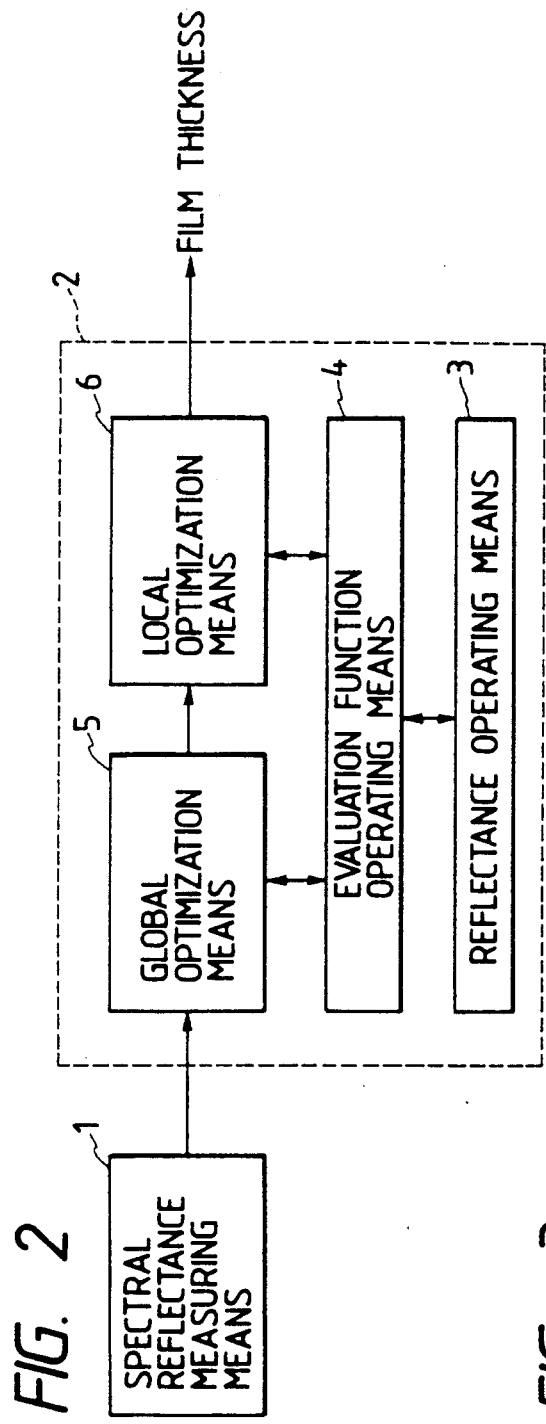

OPTICAL MEASURING DEVICE OF FILM THICKNESS

BACKGROUND OF THE INVENTION (a) Field of the Invention:

The present invention relates to an optical measuring device of film thickness which is capable of measuring film thickness without destroying or contacting measured films.

(b) Description of the Prior Art:

When spectral reflectance of a single-layer transparent thin optical film is measured with a spectral reflectance measuring device, reflectance R shows variations in conjunction with film thickness due to the effect of interference between the lights reflected by the front and rear surfaces of the thin film as wavelength $\lambda$ of measuring light varies as illustrated in FIG. 1. When reflectance R of a single-layer film has two or more local maxima or minima and a measuring light is incident perpendicularly on the thin film, it is known that thickness d of the thin film is given by the following formula:

$$d = \frac{N}{2} \cdot \frac{\lambda_a \cdot \lambda_b}{n_1(\lambda_a) \cdot \lambda_b - n_1(\lambda_b) \cdot \lambda_a}$$

wherein the reference symbol N represents number of local maxima or minima existing between a wavelength $\lambda_a$ at which a local maximum or minimum exists and another wave length $\lambda_b$ at which another local maximum or minimum exists, the reference symbols $n_1(\lambda_a)$ designates refractive index of a substance constituting the thin film at the wavelength $\lambda_a$ and the reference symbol $n_1(\lambda_b)$ denotes refractive index of the substance constituting the thin film at the wavelength $\lambda_b$. In case of a multi-layer film wherein said film is composed of a plural number of layers laminated on a substrate and reflectance is measured as a total sum of interference of lights reflected by the individual layers, however, it is impossible to determine thickness values of the individual layers at the same time by the method to detect the wavelengths at which reflectance is maximum or minimum.

In view of this fact, there was contrived a method to determine thickness values of individual layers of a multi-layer film by calculating reflectance of the multi-layer film as a function only of film thickness on the basis of known angle of incidence of a measuring light as well as known refractive indices of medium on the side of incidence, a substrate and layers at each of the wavelengths at which reflectance is measured, setting an evaluation function indicating an overall difference between a measured value and theoretical value of reflectance at each wavelength, and determining a combination of film thickness values which minimizes values of the evaluation function. However, such a series of functions generally has a plural number of local solutions, and it is necessary to search for a global solution while preventing the series of the functions from being settled at the local solutions. For this purpose, it is possible to use a global optimization method which is capable of determining thickness values of individual layers of a multi-layer film by permitting finding a global solution even when a plural number of local solutions exist (Refer to Japanese Patent Preliminary Publication No. Sho 63-32307).

Though the global optimization method permits determining a global solution with the series of the functions which allows multiple local solutions, said method has a defect that the method requires a very long time when it is repeated until the evaluation function has a minimum values after a vicinity of a global solution is reached.

SUMMARY OF THE INVENTION

A primary object of the present invention is to provide an optical measuring device of film thickness which is capable of simultaneously measuring thickness of individual layers of a multi-layer film more speedily and accurately.

According to the present invention, this object is attained by equipping with a spectral reflectance measuring means for irradiating a multi-layer thin optical film consisting of a plural number of layers laminated on a substrate with a plural number of measuring lights having predetermined wavelengths different from one another and measuring spectral reflectance of the multi-layer thin optical film at the predetermined wavelengths while detecting lights reflected from the multi-layer thin optical film, a reflectance operating means for calculating the reflectance of the multi-layer thin optical film at said wavelengths as a function only of film thickness on the basis of known refractive indices of the substrate and layers, an evaluation function operating means for calculating values of an evaluation function representing an overall difference between the spectral reflectance obtained by the spectral reflectance measuring means at said predetermined wavelengths and the reflectance obtained by the reflectance operating means as a function only of layer thickness, a global optimization means for determining film thickness in the vicinity of a minimum value of the evaluation function by a global optimization method, and a local optimization means for determining layer thickness giving minimum values of the evaluation function by a local optimization method using the layer thickness determined by the global optimization method as initial values.

The optical measuring device of film thickness according to the present invention is capable of determining thickness of plural layers of a multi-layer film at the same time by utilizing a technique which determines thickness of the individual layers so as to accurately represent the values of spectral reflectance determined by measurements at a plural number of points within a predetermined wavelength range. Determination of film thickness is performed by adequately combining a global optimization method with a local optimization method. Accordingly, film thickness can be determined speedily and accurately.

This and other objects as well as the features and advantages of the present invention will become apparent from the following detailed description of the preferred embodiment when taken in conjunction with the accompanying drawings.

BRIEF DESCRIPTION OF THE DRAWINGS

FIG. 2 is a block diagram visualizing the concept of the optical measuring device of film thickness according to the present invention;

FIG. 3 is a block diagram illustrating an embodiment of the optical measuring device of film thickness according to the present invention:

DETAILED DESCRIPTION OF THE PREFERRED EMBODIMENT

Figure 1:
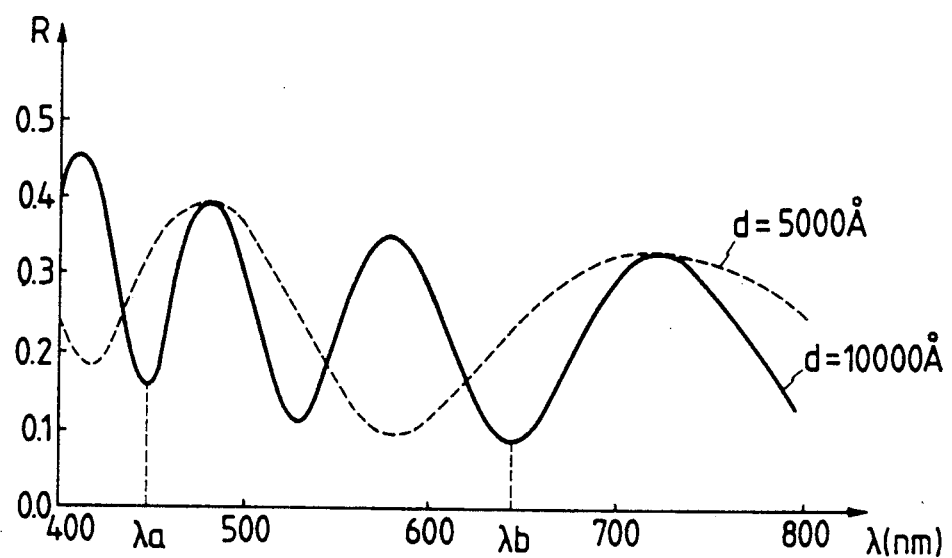
FIG. 1 is a graph illustrating distribution of spectral reflectance of a single-layer transparent thin film with regard to wavelengths of measuring lights.

First, the fundamental configuration of the optical measuring device of film thickness according to the present invention will be described with reference to FIG. 2. The optical measuring device comprises a spectral reflectance measuring means 1 and a film thickness deciding means 2. The optical measuring device according to the present invention is capable of measuring thickness of plural layers of a thin optical film which is composed of plural layers and a substrate having known refractive indices when it is placed in a medium, for example air, having a preliminarily known refractive index. In order to determine thickness of the layers of a thin film, spectral reflectance of the thin film selected as a sample is measured with the spectral reflectance measuring means 1 using measuring lights within a predetermined wavelength range. A certain number of wavelengths are adequately selected within this wavelength range and the values of reflectance at these wavelengths are chosen for subsequent data processing. In the film thickness deciding means, on the other hand, the reflectance operating means 3 calculated reflectance at each wavelength as the function of film thickness only by using the known refractive indices, angle of incidence of the measuring lights and the above-mentioned selected wavelengths in the formula for determining reflectance, the evaluation function operating means 4 calculates values of the evaluation function determined for judging an overall difference between the above-mentioned measured value and a theoretical value at each wavelength, and the global optimization means 5 and the local optimization means 6 decide a combination of film thickness values which gives the minimum value of the evaluation function by a global optimization method and a local optimization method respectively.

Figure 4:
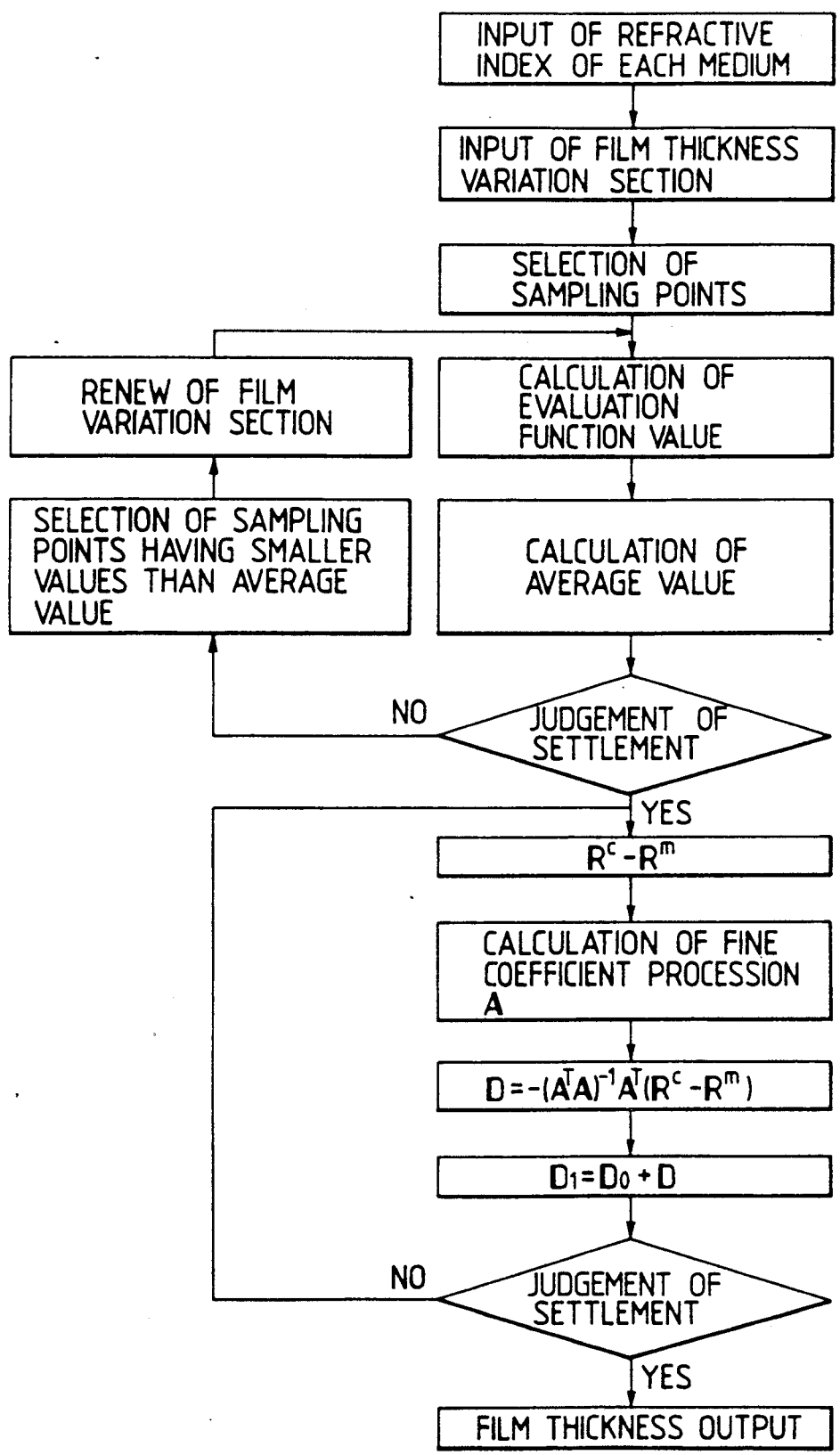
FIG. 4 is a flow chart visualizing data processing sequence in the film thickness deciding means used in the embodiment illustrated in FIG. 3.

FIG. 3 is a block diagram illustrating an embodiment of the optical measuring device of film thickness according to the present invention and FIG. 4 shows a flow chart visualizing data processing in the film thickness deciding means used in the embodiment.

In FIG. 3, the spectral reflectance measuring means 1 is equipped with a light source LS for emitting measuring lights, a monochromator 11 and a photoelectric converter means 12. Further, the film thickness deciding means 2 comprises a reflectance operating means 13, an evaluation function operating means 14, a global optimization means 15 and a local optimization means 16. Added to the global optimization means 15 and the local optimization means 16 are settlement judging means 17 and 18 respectively. Furthermore, arranged between the spectral reflectance measuring means 1 and the film thickness deciding means 2 is a data selecting means 19. In the spectral reflectance measuring means 1, a multi-layer film 20 consisting of N layers which have refractive indices $n_1, n_2, \ldots, n_N$ and are laminated on a substrate having a refractive index of $n_s$ is placed in a medium having a refractive index $n_o$. While allowing a measuring light having a spectral distribution covering the predetermined wavelength range to be emitted from the light source LS and to be incident on the multi-layer film 20 at a predetermined angle of incidence $\phi_0$, the light reflected by the multi-layer film is received by the photoelectric converter means 12 through the monochromator 11 and spectral reflectance is measured continuously within the predetermined wavelength range. Out of the values thus measured, the data selecting means 19 selects reflectance data $R_1^m, R_2^m, \ldots, R_M^m$ corresponding to M wavelengths $\lambda_1, \lambda_2, \ldots, \lambda_M$. Increase of M will enhance measuring accuracy of layer thickness but require a longer time for data processing. It will therefore be proper to select an adequate value for M taking both the measuring accuracy and data processing time into consideration. In addition, the data selecting means 19 will be unnecessary when reflectance is to be measured only at M wavelengths preliminarily selected. On the other hand, the reflectance operating means 13 calculates M reflectance values of $R_1^c, \ldots, R_M^c$ as variables of layer thickness according to the formula for determining reflectance and by using the known refractive indices $n_0, n_1, \ldots, n_N, n_S$, the angle of incidence $\phi_0$, and the selected wavelengths $\lambda_1, \ldots, \lambda_M$.

The formula for determining reflectance of multi-layer films is described detailedly in Optical Engineering Handbook (Asakura Shoten), P160–169, etc., and not explained particularly herein. On the basis of the reflectance data obtained by the measurements and the calculated values of the reflectance function, layer thickness is determined in the procedures described below. First, the evaluation function operating means 14 calculates values of an evaluation function by using $R_1^m, \ldots R_M^m$ and $R_1^c, \ldots, R_M^c$ in the evaluation function for evaluating overall differences between the reflectance data and values of the reflectance function. The calculated values constitute a function of layer thickness of $d_1, \ldots, d_N$. As the evaluation function for this purpose, it is conceivable to use, for example, the following formula (1):

$$E = \sum_{i=1}^{M} W_i (R_i^c - R_i^m)^2 \quad (1)$$

wherein the reference symbol $W_i$ represents weight of each evaluation function of the formula (1).

Since the difference between $R_i^m$ and $R_i^c$ is the minimum from an overall viewpoint at the point where the function has a minimum value, it can be regarded that the values of $d_1, \ldots, d_N$ at this point are thickness values of the individual layers of the measured multi-layer film.

Figure 5:
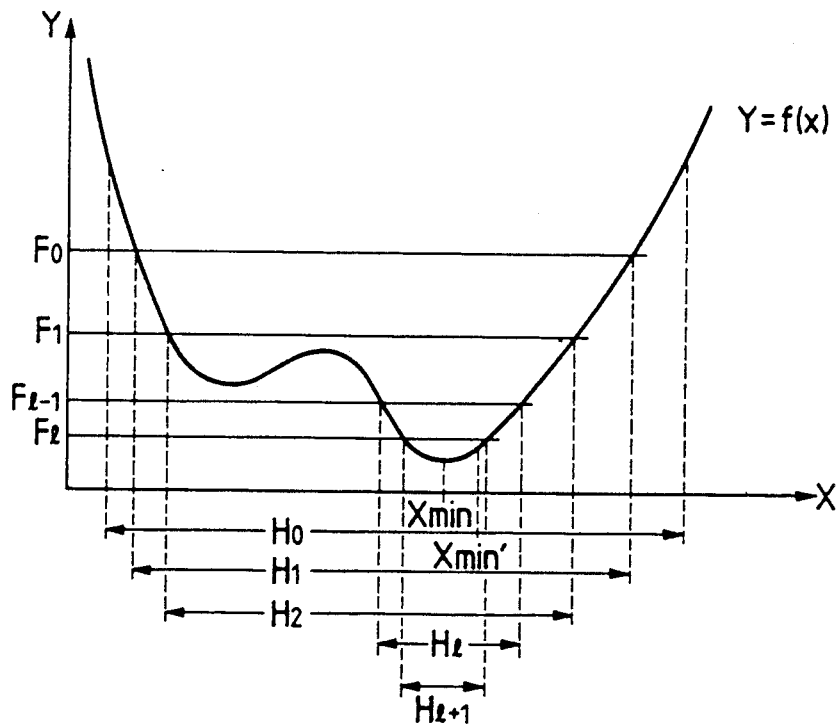
FIG. 5 is a diagram visualizing the concept of the global optimization method used in the Embodiment illustrated in FIG. 3.

According to the present invention, approximate values of $d_1, \ldots, d_N$ which give a minimum value of the evaluation function E are determined by using the global optimization method and then accurate values of $d_1, \ldots, d_N$ are calculated by the local optimization method using the approximate values as the start points. In the first place, the concept of the global optimization method used in the embodiment of the present invention will be described with reference to FIG. 5. In a case where a minimum value of the function $y = f(x)$ comprising a single variable of x is to be determined, a variation section $H_0$ of the variable covering the minimum value is specified. When an adequate number of sampling points $x_1, \ldots, x_L$ are selected within this section and an average $$F_0 = \frac{1}{L} \sum_{i=1}^{L} f(x_i)$$

of the values of f(x) at these sampling points is calculated. Then, a new section $H_1$ of the variable x determined by the intersections between y=f(x) and y=$F_1$ is adopted, an adequate number of sampling points are selected again within this new section, and when an average value of f(x) is calculated, $F_1$ is always smaller than $F_0$. By repeating these procedures, the average value is decreased at each step and f(x) is converged toward the point at which the value of x corresponding to the minimum value of f(x) as indicated by $F_l$ and $H_l$ whether or not a local minimum value exists. When the average value $F_l$ or difference between two average values $F_l - F_{l-1}$ becomes smaller than a certain preset value, it can be considered that f(x) has substantially reached to the minimum value $X_{min}$. In order to apply this method to calculation of layer thickness, initial values $(d_1)_0, (d_2)_0, \ldots, (d_N)_0$ of sections which are to allow variations of thickness of the individual layers of a multi-layer film consisting of N layers are inputted as illustrated in FIG. 4. These initial values are to be determined in view of the design values and manufacturing conditions of the multi-layer film 20 to be measured or, when such design values and manufacturing conditions are unknown, sections presumed to cover thickness of layers to be determined are to be inputted. The evaluation function operating means 14 specifies an adequate number of combinations of $(d_1, \ldots, d_N)$, i.e., $D_1 = (d_{11}, \ldots, d_{N1})$, $D_2 = (d_{12}, \ldots, d_{N2}), \ldots, D_S = (d_{1S}, \ldots, d_{NS})$ as sampling points within the above-mentioned sections. By using the values of the individual combinations, the evaluation function operating means 14 calculates $E(D_1), E(D_S)$ and determines an average value thereof as follows:

$$E_1 = \frac{1}{S} \sum_{i=1}^{S} E(D_i) \tag{2}$$

Number and intervals of the sampling points may be optional. When the settlement judging means 17 judges that the value of $\bar{E}_1$ or variation rate thereof is larger than a preset value, the global optimization is repeated. In such a case, regions wherein the evaluation functions has values smaller than the average values $\bar{E}_1$ are adopted as new layer thickness variation sections $(d_1)_1, (d_2)_1, \ldots, (d_N)_1$ and the initial values of the sections $(d_1)_0, \ldots, (d_N)_0$ are replaced with the new layer thickness variation sections and $\bar{E}_0$ is replaced with $\bar{E}_1$, for selecting new sampling points and calculating values of the evaluation functions within the new layer thickness variation sections. When an average value $\bar{E}_u$ or difference between $\bar{E}_u$ and (u−1)th average value $\bar{E}_{u-1}$ becomes smaller than the preset value upon repeating the above-described procedures u times, it is regarded that f(x) has settled substantially in the vicinity of the minimum value thereof and a combination of $(d_1, \ldots, d_N)$ adequately determined out of the layer thickness variation sections $(d_1)_u, \ldots, (d_N)_u$ thus obtained are outputted as approximate values of thickness of the layers. As for the conditions for judging the settlement at the minimum value, it is necessary to select adequate values since too strict conditions will require a long time for measurement of layer thickness and too loose conditions may allow settlement at a local minimum.

Then, thickness of the layers corresponding to the minimum values of the evaluation function is determined by the local optimization method using the approximate values of thickness of the layers thus obtained as initial values. This determination corresponds, in the example illustrated in FIG. 5, to calculation of an accurate value of $X_{min}$ which gives the minimum value of the evaluation function by using as a start point the approximate value $X_{min'}$ determined by the global optimization method. For the subsequent description, the minimum square method will be taken as an example of the local optimization method. Thickness values of the individual layers of the multi-layer film consisting of N layers are represented by variables $d_1, \ldots, d_N$ respectively, reflectance functions at individual wavelengths calculated from the thickness values are designated by $R^c = (R_1^c, R_M^c)$ and reflectance data obtained as actually measured values at the individual wavelengths are denoted by $R^m = (R_1^m, \ldots, R_M^m)$. Thickness values $d_1, \ldots, d_N$ which give reflectance most coincident with the actually measured values are to be determined. For determination by the minimum square method, the following formula (3) which is quite similar to formula (1) is used as a single evaluation scale indicating degree of approximation to a target value:

$$E = \sum_{i=1}^{M} W_i (R_i^c - R_i^m)^2 \tag{3}$$

Wherein the reference symbol $W_i$ represents weight of each evaluation function contained in the above formula and is considered here as $W_i = 1$ for simplicity. Since $E \geq 0$ in the above formula (3), a combination of $d_1, \ldots, d_N$ which give the minimum value of E is to be obtained as a solution. Assuming that $R^c - R^m = R_1^c - R_1^m, \ldots, R_M^c - R_M^m$, we obtain:

$$E = \sum_{i=1}^{M} (R_i^c - R_i^m)^2 = (R^c - R^m)^T (R^c - R^m) \tag{4}$$

Hence, E is partially differentiated with regard to each of the variables:

$$\tfrac{1}{2} \mathrm{grad}\, E = A^T (R^c - R^m) = 0 \tag{5}$$

wherein $$A = \begin{pmatrix} \frac{\partial R_1^c}{\partial d_1} & \cdots & \frac{\partial R_1^c}{\partial d_N} \\ \vdots & & \vdots \\ \frac{\partial R_M^c}{\partial d_1} & \cdots & \frac{\partial R_M^c}{\partial d_N} \end{pmatrix}$$

and $A^T$ represents transposed matrix of A. In addition, variations of thickness of the individual layers are represented by a combination of thickness values D=

$$\begin{pmatrix} d_1 \\ \vdots \\ d_N \end{pmatrix}$$

obtained from $D^0 =$ $$\begin{pmatrix} \Delta d_1 \\ \vdots \\ \Delta d_N \end{pmatrix}$$

by the global optimization method, and reflectance for thickness $D_0$ is designated by $R^0$. Assuming that the local optimization is carried out within a linear region wherein reflectance $R^c$ obtained by a thickness variation of D is represented as:

$$R^c \simeq R^0 + AD \quad (6)$$

(this is a sufficiently high approximation since $\Delta d_i$ can have small values only), the formula (5) can be transformed as follows;

$$A^T(R^c - R^m) \simeq A^T(AD + R^0 - R^m) = 0$$

Hence, we obtain:

$$A^T AD + A^T(R^0 - R^m) = 0 \quad (7)$$

The variables $d_1, \ldots, d_N$ are therefore independent of one another. When $M \geq N$, we obtain:

$$D = -(A^T \cdot A)^{-1} A^T(R^0 - R^m) \quad (8)$$

wherein $(A^T \cdot A)^{-1}$ is an inverse matrix of $(A^T \cdot A)$. Accordingly, a single step of the minimum square method gives the following calculation result as a thickness value:

$$D^1 = D^0 + D \quad (9)$$

Then, the above-mentioned $D^0$ is replaced with $D^1$ and the similar calculations are repeated. These procedures are repeated until variation rate from the values of evaluation function or thickness values for $D^i$ to those for $D^{i+1}$ becomes smaller than a preset value and the finally settled values are determined as thickness values of the individual layers of the multi-layer film.

AN EXPERIMENTAL EXAMPLE

Thickness of a two-layer film which consists of a substrate and two layers having known refractive indices and thickness was measured by the method described above. The measured results were compared with those of a conventional measuring example obtained with a computer which has the same performance as that used for the experiment. The medium placed on the side of incidence was air ($n_0 = 1$), the upper layer was silicon nitride ($n_1 = 2.0$), the lower layer (the layer kept in contact with the substrate) was a film of silicon oxide ($n_2 = 1.46$), the substrate was silicon ($n_s = n_s - ik_s$), thickness of the upper layer $d_1$ was 1000 Å and thickness of the lower layer $d_2$ was 2000 Å. Refractive index of silicon was determined for the experiment by interpolation made on the basis of data on gold and silicon published in a commercially available literature (Handbook of Optical Constants of Solids: Academic Pross). Measuring lights were allowed to be incident perpendicularly ($\phi_0 = 0°$) and 77 wavelengths were selected within a wavelength range from 400 nm to 780 nm. A variation section from 900 Å to 1100 Å was selected for the upper layer, whereas a variation section from 1900 Å to 2100 Å was chosen for the lower layer. The conventional example using the global optimization method only gave $d_1 = 1000$ Å and $d_2 = 2000$ Å, and required approximately 500 seconds for calculations. The experiment using both the global optimization method and the local optimization method gave $d_1 = 1000$ Å and $d_2 = 2000$ Å and required approximately 200 seconds for calculations. As is clear from this experiment, the combination of the global optimization method and the local optimization method requires a shorter time for calculations to determine thickness of the layers than the conventional example using only the global optimization method.

Though the embodiment of the present invention uses the method disclosed by J. Opt. Soc. Am., vol. 72. 1982 PP1522~PP1528 as the global optimization method, there are known several examples usable as the global optimization method. Further, though the minimum square method is selected as the local optimization method for the present invention, it is possible to adequately combine the gradient method, conjugate gradient method, damped least square method, simplex method and so on.

As is understood from the foregoing description, the optical measuring device of film thickness according to the present invention is capable of determining thickness of individual layers of a multi-layer film at the same time by utilizing a technique permitting determining thickness of each layer so as to accurately represent spectral reflectance measured at a plural number of points within a predetermined wavelength range. Further, the optical measuring device according to the present invention permits determining thickness of layers of a multi-layer film speedily and accurately by using a combination of the global optimization method and a local optimization method.

What is claimed is:

1. An optical measuring device of film thickness for measuring thickness of levers of a multi-layer thin optical film consisting of layers having known refractive indices and laminated on a substrate having a known refractive index, wherein said optical measuring device of film thickness is equipped with a spectral reflectance measuring means for measuring spectral reflectance of said multi-layer thin optical film at predetermined wavelengths with measuring lights, a reflectance operating means for calculating said reflectance of the thin optical film at said predetermined wavelengths as a function only of layer thickness on the basis of said known refractive indices, an evaluation function operating means for calculating values of an evaluation function representing overall difference between the spectral reflectance at said predetermined wavelengths obtained with said spectral reflectance measuring means and the reflectance obtained with said reflectance operating means as a function only of layer thickness, a global optimization means for determining layer thickness in the vicinity of the minimum values of said evaluation function by a global optimization method, and a local optimization means for determining thickness giving the minimum values of the evaluation function by a local optimization method using the thickness determined by the global optimization means as initial values.

2. An optical measuring device of film thickness according to claim 1 further comprising a data selecting means for selecting reflectance data corresponding to a plural number of wavelengths out of the continuous measured values obtained with said spectral reflectance measuring means.

* * * * *